United States Patent
Saito et al.

(10) Patent No.: US 12,130,417 B2
(45) Date of Patent: Oct. 29, 2024

(54) OPTICAL SIGNAL DETECTION DEVICE, GEL MEMBER, AND OPTICAL SIGNAL DETECTION METHOD

(71) Applicant: Evident Corporation, Nagano (JP)

(72) Inventors: Yoshiharu Saito, Tokyo (JP); Kentaro Imoto, Tokyo (JP); Daisuke Nishiwaki, Tokyo (JP)

(73) Assignee: Evident Corporation, Nagano (JP)

(*) Notice: Subject to any disclaimer, the term of this patent is extended or adjusted under 35 U.S.C. 154(b) by 482 days.

(21) Appl. No.: 17/511,485

(22) Filed: Oct. 26, 2021

(65) Prior Publication Data

US 2022/0128808 A1 Apr. 28, 2022

(30) Foreign Application Priority Data

Oct. 28, 2020 (JP) .................................. 2020-180773
Aug. 20, 2021 (JP) .................................. 2021-135022

(51) Int. Cl.
| | | |
|---|---|---|
| *G02B 21/33* | (2006.01) | |
| *G02B 21/02* | (2006.01) | |
| *G02B 21/06* | (2006.01) | |
| *G02B 21/24* | (2006.01) | |
| *G02B 21/36* | (2006.01) | |

(52) U.S. Cl.
CPC ............. *G02B 21/33* (2013.01); *G02B 21/02* (2013.01); *G02B 21/06* (2013.01); *G02B 21/24* (2013.01); *G02B 21/36* (2013.01)

(58) Field of Classification Search
CPC ........ G02B 21/33; G02B 21/02; G02B 21/06; G02B 21/24; G02B 21/36; G02B 21/00; G02B 21/0004; G02B 21/361
USPC .......................... 359/385, 362, 363, 368, 369
See application file for complete search history.

(56) References Cited

U.S. PATENT DOCUMENTS

| | | | | |
|---|---|---|---|---|
| 2002/0163629 A1* | 11/2002 | Switkes | ................ | G03F 7/2041 |
| | | | | 252/582 |
| 2015/0241682 A1* | 8/2015 | Kues | ...................... | C08G 77/04 |
| | | | | 524/588 |
| 2017/0017070 A1 | 1/2017 | Suzuki | | |
| 2019/0094512 A1* | 3/2019 | Ohrt | ........................ | G02B 21/33 |

FOREIGN PATENT DOCUMENTS

| | | |
|---|---|---|
| JP | H03178647 A | 8/1991 |
| JP | H1039220 A | 2/1998 |
| JP | 2005049294 A | 2/2005 |
| JP | 2012173259 A | 9/2012 |
| JP | 2015525343 A | 9/2015 |
| JP | 2017026666 A | 2/2017 |
| WO | 2010096756 A1 | 8/2010 |
| WO | 2013181453 A2 | 12/2013 |

* cited by examiner

*Primary Examiner* — Arnel C Lavarias
(74) *Attorney, Agent, or Firm* — Holtz, Holtz & Volek PC

(57) ABSTRACT

Provided is an optical signal detection device that includes: an objective; a holding member provided between the objective and a sample to hold the sample; and a gel member that fills a space between the objective and the holding member. The gel member has ¼ scale penetration indicating a value of 44 to 111, both inclusive, measured based on a penetration test using a ¼ scale cone of JIS K 2220.

24 Claims, 22 Drawing Sheets

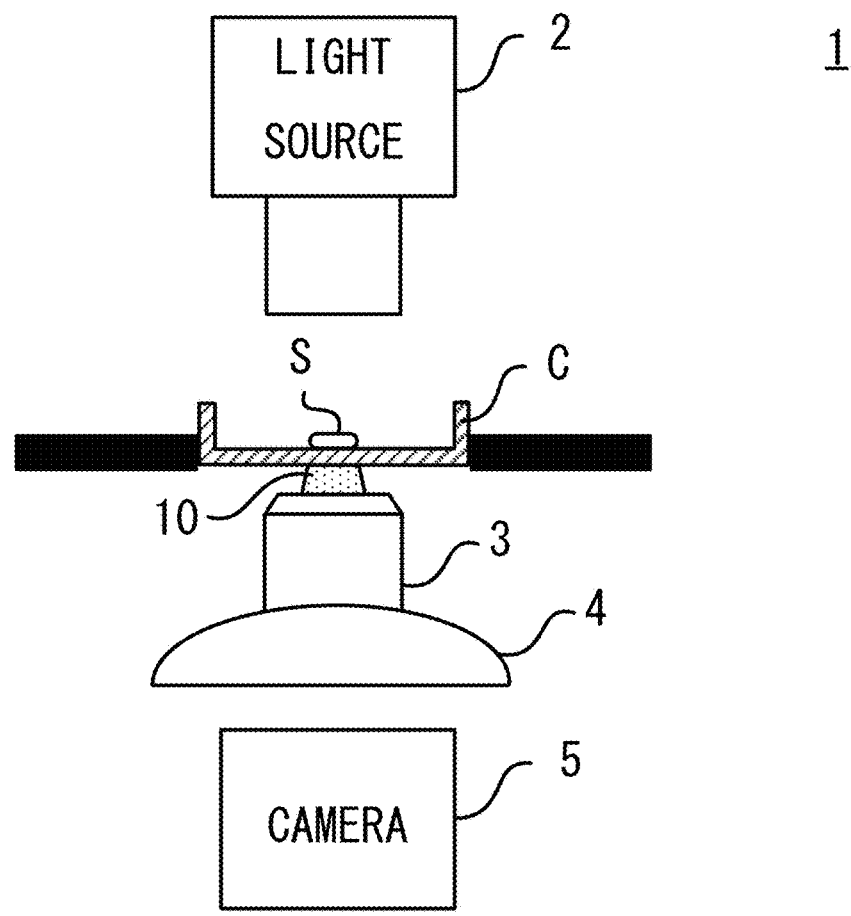
F I G. 1

| OIL | | | PENETRATION NUMBER OF TIMES | Z | P | Z | P | Z | P | Z | P | Z | P | Z | P | Z | P | Z | P |
|---|---|---|---|---|---|---|---|---|---|---|---|---|---|---|---|---|---|---|---|
| | | | | 0 | 3202 | 50 | 3252 | 100 | 3302 | 150 | 3352 | 200 | 3402 | 250 | 3452 | 300 | 3502 | 350 | 3552 |
| GEL | | | | Z | P | Z | P | Z | P | Z | P | Z | P | Z | P | Z | P | Z | P |
| 1 | 55 | 1ST | | 0 | 3185 | 57 | 3242 | 111 | 3296 | 164 | 3349 | 218 | 3402 | 276 | 3461 | 339 | 3524 | | |
| | | 2ND | | 0 | 3175 | | | 104 | 3279 | | | 214 | 3389 | | | | | | |
| | | 3RD | | 0 | 3175 | 53 | 3228 | 107 | 3282 | 164 | 3339 | 221 | 3396 | 284 | 3459 | | | | |
| | | 4TH | | 0 | 3169 | 54 | 3223 | 106 | 3275 | 161 | 3330 | 220 | 3389 | | | | | | |
| | | 5TH | | 0 | 3169 | | | 109 | 3278 | | | 224 | 3393 | | | | | | |
| | | 6TH | | 0 | 3169 | | | 108 | 3277 | | | 221 | 3390 | | | | | | |
| 2 | 62 | 1ST | | 0 | 3180 | 55 | 3235 | 110 | 3290 | 165 | 3345 | 220 | 3400 | 278 | 3458 | 340 | 3520 | | |
| | | 2ND | | 0 | 3171 | 53 | 3224 | 105 | 3276 | 160 | 3331 | 216 | 3387 | 274 | 3445 | | | | |
| | | 3RD | | 0 | 3171 | 54 | 3225 | 17 | 3278 | 162 | 3333 | 220 | 3391 | 281 | 3452 | | | | |
| | | 4TH | | 0 | 3171 | 52 | 3223 | 105 | 3276 | 159 | 3330 | 217 | 3388 | | | | | | |
| | | 5TH | | 0 | 3171 | | | 106 | 3277 | | | 218 | 3389 | 278 | 3449 | | | | |
| | | 6TH | | 0 | 3170 | | | 105 | 3275 | | | 216 | 3386 | | | | | | |
| 3 | 69 | 1ST | | 0 | 3195 | 52 | 3247 | 104 | 3299 | 157 | 3352 | 210 | 3405 | 263 | 3458 | 317 | 3512 | 375 | 3570 |
| | | 2ND | | 0 | 3183 | 52 | 3235 | 103 | 3286 | 156 | 3339 | 209 | 3392 | 263 | 3445 | 320 | 3503 | | |
| | | 3RD | | 0 | 3183 | 52 | 3235 | 104 | 3287 | 157 | 3340 | 211 | 3394 | 266 | 3449 | | | | |
| | | 4TH | | 0 | 3181 | 52 | 3233 | 103 | 3284 | 156 | 3337 | 210 | 3391 | | | | | | |
| 4 | 91 | 1ST | | 0 | 3184 | 52 | 3236 | 104 | 3288 | 158 | 3342 | 212 | 3396 | 269 | 3453 | 329 | 3513 | 391 | 3575 |
| | | 2ND | | 0 | 3176 | 52 | 3228 | 104 | 3280 | 158 | 3334 | 211 | 3387 | 267 | 3443 | 327 | 3503 | | |
| | | 3RD | | 0 | 3176 | 53 | 3229 | 104 | 3280 | 157 | 3333 | 210 | 3386 | 266 | 3442 | | | | |
| | | 4TH | | 0 | 3175 | 52 | 3228 | | | 158 | 3333 | | | | | | | | |
| | | 5TH | | 0 | 3175 | 52 | 3228 | 104 | 3279 | | | 210 | 3285 | | | | | | |

| OIL | PENETRATION NUMBER OF TIMES | | Z | P | Z | P | Z | P | Z | P | Z | P | Z | P | Z | P | Z | P |
|---|---|---|---|---|---|---|---|---|---|---|---|---|---|---|---|---|---|---|
|   |   |   | 0 | 3180 | 50 | 3230 | 100 | 3280 | 150 | 3330 | 200 | 3380 | 250 | 3430 | 300 | 3480 | 350 | 3530 |
| GEL |   |   | Z | P | Z | P | Z | P | Z | P | Z | P | Z | P | Z | P | Z | P |
| 5 | 111 |   | 0 | 3174 | 51 | 3225 | 102 | 3276 | 153 | 3327 | 205 | 3379 | 259 | 3433 | 313 | 3487 |   |   |
|   |   |   | 0 | 3174 | 51 | 3225 | 102 | 3276 | 154 | 3328 | 205 | 3379 | 259 | 3433 |   |   |   |   |
| 6 | 111 |   | 0 | 3166 | 52 | 3218 | 103 | 3269 | 154 | 3220 | 206 | 3372 | 258 | 3424 | 312 | 3478 |   |   |
|   |   |   | 0 | 3166 | 52 | 3218 | 103 | 3269 | 154 | 3220 | 206 | 3371 | 258 | 3424 | 312 | 3478 |   |   |
| 7 | 111 |   | 0 | 3167 | 51 | 3218 | 102 | 3269 | 154 | 3221 | 204 | 3371 | 256 | 3423 | 309 | 3476 |   |   |
|   |   |   | 0 | 3167 | 51 | 3218 | 102 | 3269 | 153 | 3220 | 204 | 3371 | 256 | 3423 | 308 | 3475 | 367 | 3534 |
| 8 | 111 |   | 0 | 3160 | 51 | 3211 | 102 | 3262 | 152 | 3312 | 203 | 3363 | 255 | 3415 | 307 | 3467 | 361 | 3521 |
|   |   |   | 0 | 3159 | 51 | 3210 | 102 | 3261 | 152 | 3311 | 203 | 3362 | 255 | 3414 |   |   |   |   |

F I G. 1 1

OPTICAL SIGNAL DETECTION DEVICE, GEL MEMBER, AND OPTICAL SIGNAL DETECTION METHOD

CROSS REFERENCE TO RELATED APPLICATIONS

This application is based upon and claims the benefit of priority from prior Japanese Patent Applications No. 2020-180773, filed Oct. 28, 2020 and No. 2021-135022, filed Aug. 20, 2021, the entire contents of which are incorporated herein by this reference.

BACKGROUND OF THE INVENTION

Field of the Invention

The present disclosure herein relates to an optical signal detection device, a gel member, and an optical signal detection method.

Description of the Related Art

Currently, research using cell aggregates such as spheroids or organoids acquired by three-dimensionally culturing a large number of collected cells is drawing attention. Such samples described above are in a size of about 100 μm to 500 μm, for example.

In a deep cell observation of such samples, an immersion objective is used in general. With the immersion objective, a higher numerical aperture can be acquired compared to a case of using a dry objective by filling the space between the objective and the sample (more strictly, a holding member that holds the sample) with an immersion liquid.

By using an immersion liquid exhibiting a refractive index close to that of the sample, it is also possible to suppress spherical aberrations caused due to the refractive index mismatch in the interface between the sample and the immersion liquid (air in the case of the dry objective). As disclosed in Japanese Patent Laid-Open No. 2017-026666 and the like, the influence of the spherical aberrations caused due to the refractive index mismatch is more prominent as the observation position becomes deeper. Therefore, suppression of the spherical aberrations makes it possible to perform the observation of deeper positions.

SUMMARY OF THE INVENTION

An optical signal detection device according to an aspect of the present invention includes: an objective; a holding member provided between the objective and a sample to hold the sample; and a gel member that fills a space between the objective and the holding member. The gel member has ¼ scale penetration indicating a value of 44 to 111, both inclusive, measured based on a penetration test using a ¼ scale cone of JIS K 2220.

A gel member according to an aspect of the present invention is a gel member attached to a front end of an objective. The gel member has ¼ scale penetration indicating a value of 44 to 111, both inclusive, measured based on a penetration test using a ¼ scale cone of JIS K 2220.

An optical signal detection method according to an aspect of the present invention includes: illuminating a sample with light in a state where a space between an objective and a holding member that holds a sample is filled with a gel member having ¼ scale penetration indicating a value of 44 to 111, both inclusive, measured based on a penetration test using a ¼ scale cone of JIS K 2220; and detecting, by a photodetector, light from the sample being incident via the objective.

BRIEF DESCRIPTION OF THE DRAWINGS

The present invention will be more apparent from the following detailed description when the accompanying drawings are referenced.

FIG. 1 is a diagram illustrating an example of a configuration of a microscope device according to an embodiment;

FIG. 10 is a table indicating a result of comparison between cases of using oil and using gel members as immersion liquids;

FIG. 11 is another table indicating a result of comparison between cases of using oil and using gel members as immersion liquids;

DESCRIPTION OF THE EMBODIMENTS

Figure 2:
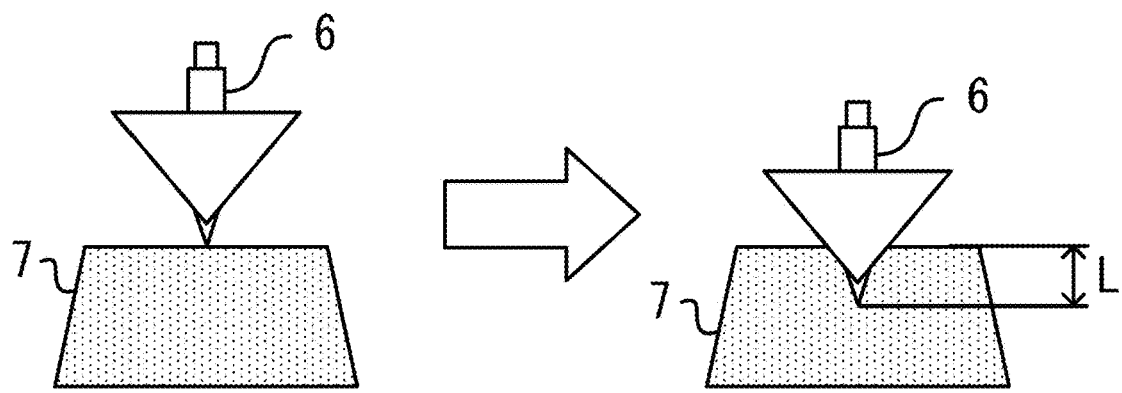
FIG. 2 is a diagram for describing a penetration measurement method.

In an actual observation, a dry objective and an immersion objective may be used by being switched in the middle of the observation. A typical example of such use is a case where a dry objective having a wider field of view with a relatively low magnification is used first to search an area of interest, and then an immersion objective having higher resolution is used thereafter to observe the area of interest in detail, for example.

However, when switching the dry objective to the immersion objective, it is necessary to feed an immersion liquid anew to fill the space between the objective and a sample with the immersion liquid. Furthermore, when switching the immersion objective to the dry objective, it is necessary to securely wipe off the immersion liquid such that the immersion liquid does not remain on the surface of the sample. As described, when switching the dry objective and the immersion objective, various kinds of additional work other than the switching work of the lenses is required. Therefore, the observation is temporarily interrupted so that it is difficult to perform a smooth observation.

In the meantime, compared to a case of using the dry objective, there also are various issues in a case of observing the sample only with the immersion objective. For example, when water is used as the immersion liquid, the immersion liquid is evaporated when an observation is continued for a long time. Thus, it is necessary to feed the immersion liquid as appropriate in the middle of the observation. Furthermore, when oil is used as the immersion liquid, there are such issues that it takes time and effort to do cleaning, it is likely to cause air bubbles due to high viscosity, and so on. Moreover, when an objective with a long working distance is used in an inverted microscope, it is difficult to maintain the immersion liquid between the objective and the sample with the surface tension. It is also difficult to maintain the immersion liquid with the surface tension in a case of observing the sample from oblique and lateral directions. In this regard, there are same issues as those of the case using the long working distance objective. Therefore, in those cases, it is necessary to have a large-scale device for maintaining the immersion liquid between the objective and the sample. Furthermore, in a case of performing an observation over a wide range in the depth direction, the distance between the objective and the sample changes greatly during the observation. Therefore, the immersion liquid may easily be spilled from between the objective lens and the sample.

As described, it is the current circumstances that users are to bear heavier burdens in the case of using the immersion objective compared to the case of using the dry objective. Considering such circumstances described above, embodiments of the present invention will be described hereinafter.

FIG. 1 is a diagram illustrating an example of the configuration of a microscope device according to an embodiment. A microscope device 1 illustrated in FIG. 1 is an inverted microscope for observing a sample S from below, and it is an example of an optical signal detection device that detects optical signals. As illustrated in FIG. 1, the microscope device 1 includes a light source 2, an objective 3 mounted on a revolving nosepiece 4, and a camera 5. The objective 3 is the so-called immersion objective that is used in a state where the space between the objective and a container is filled with an immersion liquid. The container C for housing the sample S is a glass bottom dish or the like, for example, and it is an example of a holding member that holds the sample S. Although not specifically limited, the sample S is a biological sample such as a cell, for example. The sample S may be a sample having a thickness of several hundred μm, such as three-dimensionally cultured spheroids or organoids.

While FIG. 1 illustrates an example where the microscope device 1 is an inverted microscope, the microscope device 1 may also be an upright microscope. In that case, a gel member 10 may be filled in the space between a cover glass as another example of the sample holding member and the objective 3.

The microscope device 1 irradiates the sample S with light from the light source 2, and detects light from the sample S by the camera 5 to acquire an image of the sample S. There is no specific limit set for the observation method of the microscope device 1. For example, images of the sample S may be acquired by the brightfield microscopy or images of the sample S may be acquired by the fluorescence microscopy. The observation method may also be other method such as the phase contrast microscopy, the differential interference contrast microscopy, or the like.

Between the immersion objective 3 and the container C, the microscope device 1 includes the gel member 10 having a higher refractive index than that of air instead of the immersion liquid as a fluid.

The gel member 10 has no fluidity unlike the immersion liquid. Therefore, unlike the immersion liquid held between the objective 3 and the container C by the surface tension, the gel member 10 can be easily disposed on an observation light path between the objective 3 and the container C and also can be easily removed from the observation light path. Thus, even in a case of using the immersion objective and the dry objective in a switching manner, it is possible to do the switching work quickly. Furthermore, the gel member 10 having no fluidity does not spill off from the objective 3 during the observation, unlike the immersion liquid. Therefore, there is no risk of polluting the objective 3 and the surroundings thereof, so that it is easy to perform cleaning after use. Furthermore, there is no extreme volume reduction caused by evaporation, so that it is unnecessary to do additional feeding (unlike the case of the immersion liquid) and possible to easily perform a long-time observation. Furthermore, since the gel member 10 has a relatively high viscosity, it can stay stably between the objective 3 and the container C even in the case of oblique and lateral observations. As described, the gel member 10 is handled much more easily compared to the immersion liquid, so that the burden imposed on the user due to the use of the immersion objective can be lightened greatly.

Furthermore, like the immersion liquid, the gel member 10 has a higher refractive index than that of air. Therefore, it is possible to achieve a high numerical aperture by demonstrating the performance of the immersion objective 3 and to acquire bright images with high resolution. Moreover, the refractive index difference with respect to those of the container C and the sample S becomes smaller compared to the case where air is being interposed. Therefore, as in the case of using the immersion liquid, it is possible to observe the sample S to a deep part while suppressing the spherical aberrations generated due to the refractive index difference with respect to those of the container C and the sample S. Thereby, the use of the gel member 10 makes it possible to observe the three-dimensional structure of the sample in a fine manner.

As described above, with the microscope device 1 that performs an observation by using the gel member 10 instead of the immersion liquid, it is possible to observe the sample S in a fine manner without imposing excessive burdens on the user even in a case of using the immersion objective 3. Furthermore, since the dry objective and the immersion objective can be switched smoothly, the observation can be performed efficiently while suppressing interruption of the observation due to switching of the objectives to a short time.

Figure 3:
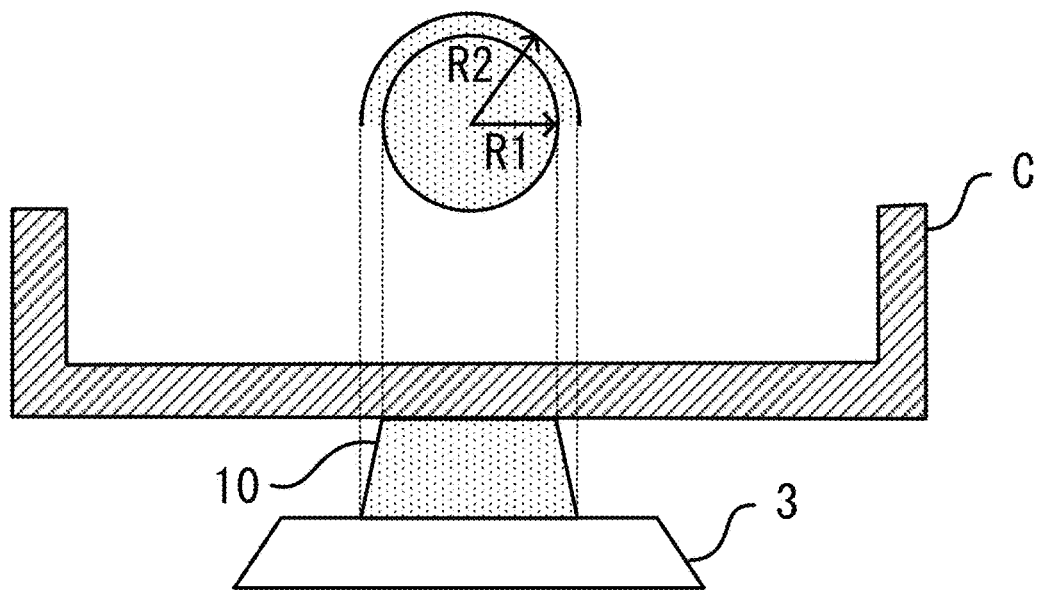
FIG. 3 is a diagram for describing a shape of a gel member.
Figure 4:
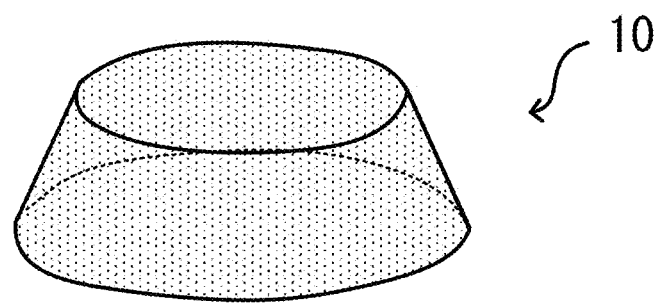
FIG. 4 is a diagram illustrating an example of the shape of the gel member.
Figure 5:
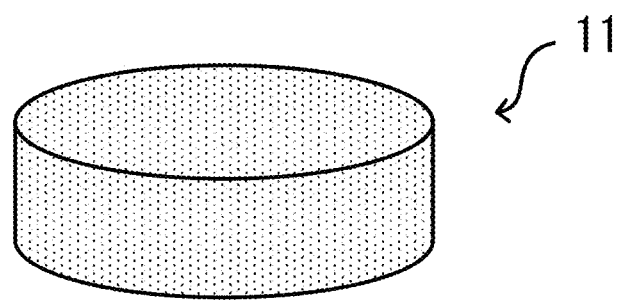
FIG. 5 is a diagram illustrating another example of the shape of the gel member.
Figure 6:
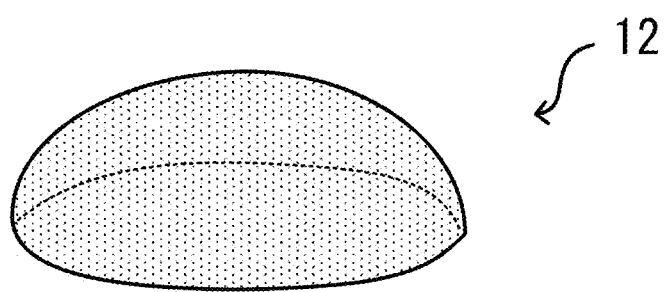
FIG. 6 is a diagram illustrating still another example of the shape of the gel member.
Figure 7:
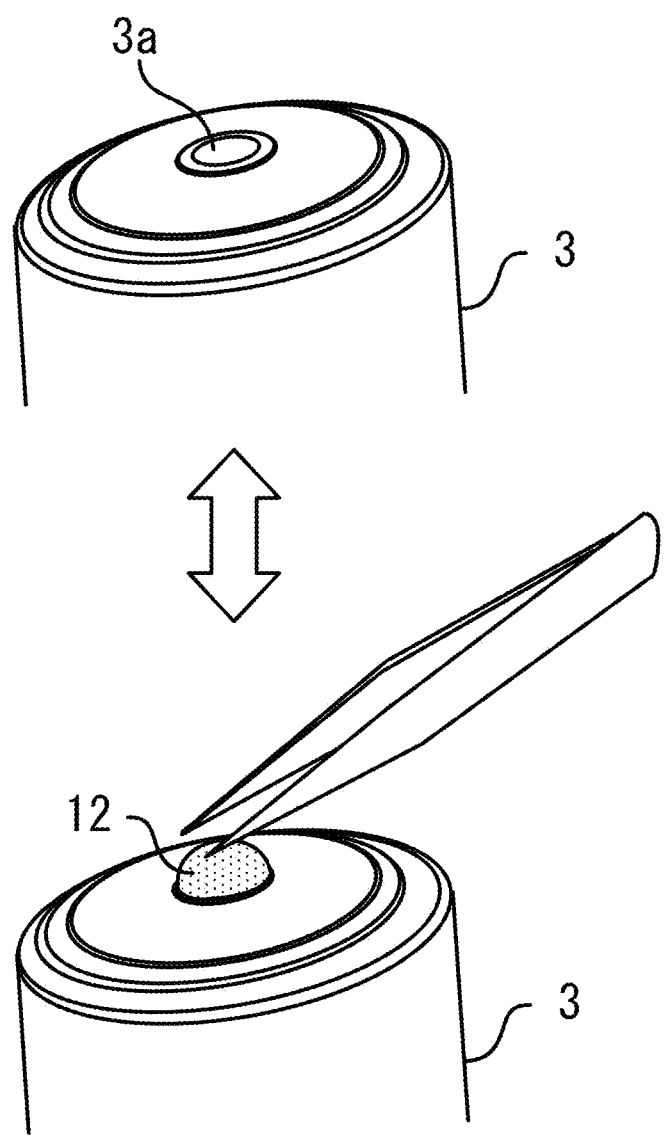
FIG. 7 is a diagram for describing an attaching/detaching method of the gel member to/from an objective.

FIG. 2 is a diagram for describing a penetration measurement method. FIG. 3 is a diagram for describing the shape of the gel member. FIG. 4 to FIG. 6 are diagrams illustrating examples of the shape of the gel member. FIG. 7 is a diagram for describing an attaching/detaching method of the gel member to/from the objective. Hereinafter, a desirable configuration of the microscope device 1 will be described by referring to FIG. 2 to FIG. 7.

The gel member 10 provided to the microscope device 1 is desirable to have ¼ (one quarter) scale penetration indicating a value of 44 to 111, both inclusive, measured based on a penetration test using a ¼ scale cone of JIS K 2220 described above. In general, the penetration as defined in JIS K 2220 means the distance a standard cone or an optional cone penetrates into a sample under a regulated condition of load, time, and temperature, which is expressed by multiplying the value measured in a unit of 0.1 mm by 10. Meanwhile, ¼ scale penetration is one quarter scale penetration defined in JIS K 2220, which is the penetration measured by using a prescribed cone (¼ scale cone) that is a ¼ reduction of a standard cone or an optional cone. That is, as illustrated in FIG. 2, the ¼ scale penetration is related a distance L where a ¼ scale cone 6 penetrates into a test target 7 under a regulated condition of load, time, and temperature, and is expressed by multiplying the value measured in a unit of 0.1 mm by 10. Note that the measurement is conducted under a condition of temperatures at 25° C.±0.5° C.

When the ¼ scale penetration of the gel member 10 exceeds 111 as the upper limit value, the gel member 10 is too soft to be used instead of the immersion liquid. Thus, the gel member 10 is difficult to maintain its shape and is crushed. As a result, the space between the objective 3 and the container C cannot be filled with the gel member 10, so that a good observation may not be performed. Especially, when observing the sample S in a state where there is a long distance between the objective 3 and the container C by using the objective 3 having a long working distance (for example, WD=4 mm or the like), such a circumstance as described above is likely to occur. Furthermore, when the gel member 10 is too soft, the shape of the gel member 10 cannot be maintained when releasing it from a die at the time of making the gel member 10 into a prescribed shape by using the die, thereby increasing the percentage of defects. The durability is also deteriorated, so that the number of repeated uses is limited.

On the other hand, when the ¼ scale penetration of the gel member 10 becomes lower than 44 as the lower limit value, the gel member 10 is too hard to be used instead of the immersion liquid. When the gel member 10 has proper hardness, the gel member 10 is deformed in accordance with the distance between the objective 3 and the container C so that the space between the objective 3 and the container C can be filled with the gel member 10 appropriately without applying an excessive pressure to the container C. In the meantime, when the gel member 10 is too hard, that is, when the ¼ scale penetration of the gel member 10 becomes lower than 44 as the lower limit value, the gel member 10 is not flexibly deformed even when the distance between the objective 3 and the container C changes. Therefore, when the objective 3 is brought closer to the container C for performing a deep observation, the gel member 10 pressed by the objective 3 does not spread sufficiently between the objective 3 and the container C so that the distance between the objective 3 and the container C cannot be shortened to an expected distance. Thereby, a large force is applied to the container C, which may cause inconveniences such as deforming the container, shifting the position of the container, and the like. As a result, the observation position may also be shifted, so that it becomes difficult to observe the target area properly.

By defining the ¼ scale penetration of the gel member 10 to be the value of 44 to 111, both inclusive, the microscope device 1 can perform observations appropriately without causing any inconveniences even when the distance between the objective 3 and the container C varies. Furthermore, even when there is a change in the positional relationship generated between the objective 3 and the container C in directions orthogonal to the optical axis, the microscope device 1 can perform observations appropriately without causing any inconveniences. Thereby, with the microscope device 1, it is possible to maintain the effect of being able to observe the sample S in a fine manner without imposing excessive burdens on the user over a wide observation range.

As for the gel member 10 filling the space between the objective 3 and the container C, as illustrated in FIG. 3, it is desirable for the contact area between the gel member 10 and the objective 3 (referred to as a first contact area hereinafter) to be larger than the contact area between the gel member 10 and the container C (referred to as a second contact area hereinafter). Therefore, the gel member 10 may have a truncated cone shape as illustrated in FIG. 4, for example, and it is desirable to be disposed with the vertex of the cone facing toward an objective 3 side in that case. FIG. 3 illustrates a state where the gel member 10 is in contact with the container C in a circular area with a radius R1 and the gel member 10 is in contact with the objective 3 in a circular area with a radius R2 (>radius R1).

When the first contact area is larger than the second contact area, the gel member 10 can stick more firmly to the objective than to the container C. Thereby, the gel member 10 can be separated from the container C and remain on the objective 3 when the distance between the objective 3 and the container C is expanded to be wider than the thickness of the gel member 10. Therefore, when switching the objective 3 with another objective in the microscope device 1, the gel member 10 stuck to the objective 3 is moved out of the light path along with the objective 3 by rotation of the revolving nosepiece. Thereby, work of the user for removing the gel member 10 can be omitted, so that it is possible to switch the objectives smoothly.

While FIG. 4 illustrates the gel member 10 in a truncated cone shape as an example, the shape of the gel member provided to the microscope device 1 is not limited to the truncated cone shape like the gel member 10. The microscope device 1 may include a cylindrical shape gel member 11 as illustrated in FIG. 5 instead of the gel member 10, for example, or may include a gel member in a prismatic shape or a truncated pyramid shape.

Furthermore, as illustrated in FIG. 6, the microscope device 1 may include a gel member having a bottom face and a convex face formed with a curvature. In that case, it is desirable for the gel member 12 to have the convex face on a container C side. With the tapered shape gel member whose cross-sectional area becomes smaller from the objective 3 toward the container C like the gel member 10 and the gel member 12, the relationship in regards to the size of the contact areas described above can be easily implemented. Thus, from the viewpoint of simplifying the switching work of the objectives, it is desirable for the gel member to be in a tapered shape in which a cross-sectional area becomes smaller from the objective 3 toward the container C.

The gel member has viscosity as described above and sticks to the objective in a freely detachable manner. Therefore, when attaching the gel member to the objective 3, the gel member (the gel member 12 herein) may simply be placed on a front 3a part of the objective 3 by using tweezers or the like as illustrated in FIG. 7. Since the gel member 12 sticks to the objective 3, the gel member 12 can be easily attached to the objective 3. Similarly, tweezers or the like may also be used when removing the gel member 12 from the objective 3. As described, the gel member 12 can stick to the objective 3 in a freely detachable manner, so that preparation work for observations can be performed easily.

Hereinafter, a more desirable configuration of the microscope device 1 will be described. It is desirable for the thickness of the gel member (for example, the gel member 10) provided to the microscope device 1 to be 1.1 times to 1.5 times, both inclusive, of the working distance of the objective 3. With the thickness of the gel member 10 being 1.1 times or more of the working distance, it is possible to observe the surface of the sample S (the bottom face of the sample S in FIG. 1) while filling the space between the container C and the objective with the gel member 10 without a gap by taking the thickness of the container C into consideration. Furthermore, with the thickness of the gel member 10 being 1.5 times or less of the working distance, it is possible to prevent the gel member 10 from being excessively compressed when observing the deep part of the sample S. When the gel member 10 is excessively compressed, a large pressure is applied to the container C so that the container C is deformed or the position of the container C is shifted. As a result, the observation position is displaced and it becomes difficult to observe the target area properly. When the thickness is 1.5 times or less than the working distance, such a large pressure is not applied to the gel member 10. Therefore, there is less risk of having deformation of the container C and position shift of the container C, thereby making it possible to perform an observation at an intended position. Therefore, it is possible to acquire an image at the intended position by filling the space between the container C and the objective 3 with the gel member 10 without a gap even in Z-stack imaging performed by scanning the sample S in the depth direction.

Furthermore, it is desirable for the refractive index difference between the gel member 10 and the container to be within ±0.1. By keeping the refractive index difference to be within ±0.1, it is possible to perform observations in a fine manner by suppressing the spherical aberrations caused due to the refractive index mismatch. The effect thereof is prominent in deep observations, so that it is preferable especially in a case of observing thick samples, and the like. Note that the standard refractive index of the bottom face of a glass bottom dish, a cover glass, and the like is 1.52. Therefore, when there is a large variation in the thickness of the glass bottom dish and the cover glass, the gel member 10 may have a refractive index within a range of 1.52±0.1, for example. This makes it possible to decrease the spherical aberrations generated due to a change in the thickness without using a correction ring mechanism of the objective.

Figure 8:
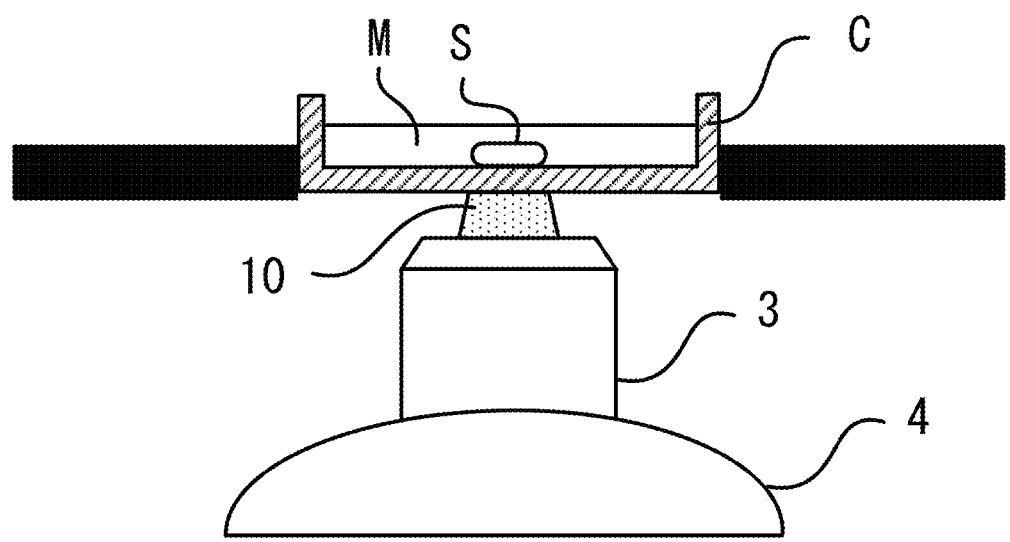
FIG. 8 is a diagram illustrating an example of a relationship between a sample and a medium within a container.
Figure 9:
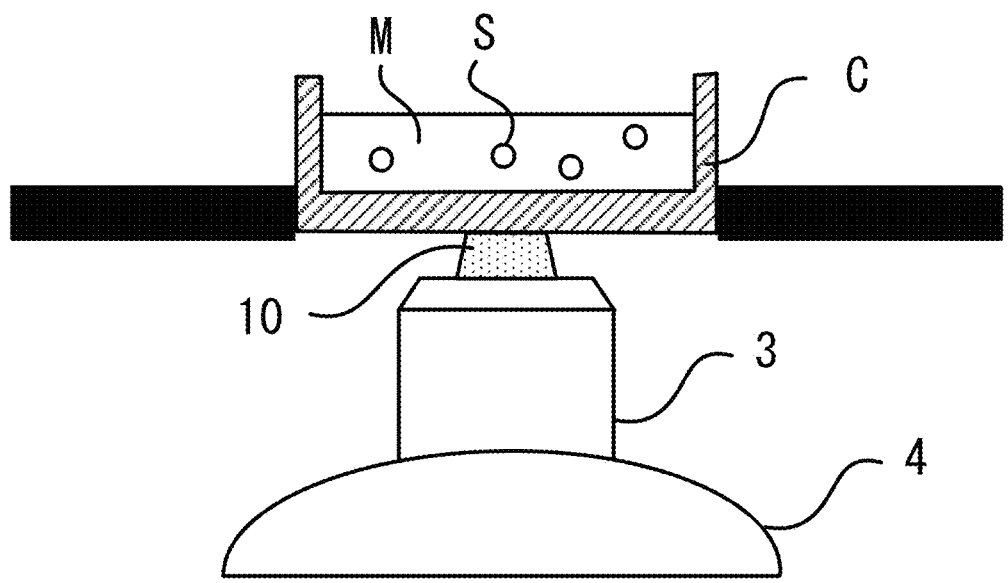
FIG. 9 is a diagram illustrating another example of a relationship between samples and a medium within a container.

Furthermore, it is desirable for the refractive index difference between the gel member 10 and the sample S or a medium M covering the sample S to be within ±0.1. FIG. 8 and FIG. 9 are diagrams illustrating examples of the relationship between the sample and the medium within the container. Although not specifically limited, the medium M is a culture medium, a clearing solution, or the like, for example. By keeping the refractive index difference to be within ±0.1, it is possible to perform observations in a fine manner by suppressing the spherical aberrations caused due to the refractive index mismatch in deep observations. As illustrated in FIG. 8 and FIG. 9, the sample S may be in contact with the bottom face of the container C or may be isolated from the bottom face of the container C. Even in a case where the sample S is isolated from the bottom face of the container C via the medium M, it is possible to perform the observation of the sample S by suppressing the spherical aberrations caused due to the refractive index mismatch when observing the sample S via the medium M if the refractive index difference is within ±0.1.

FIG. 10 and FIG. 11 are tables indicating the result of comparison between cases of using oil and using gel members as the immersion liquids. Hereinafter, by referring to FIG. 10 and FIG. 11, described are the results of comparisons between the case of using oil and the case of using the gel members having ¼ scale penetration in a range of 44 to 111, both inclusive, found by the inventors of the present disclosure as a desirable range.

Table T1 illustrated in FIG. 10 and Table T2 illustrated in FIG. 11 indicate the relationships between a reference z coordinate (Z) having the bottom face of the sample S when observed by using oil as the reference and an observation z coordinate (P) indicating the Z coordinate of the microscope device at that time, and indicate the relationships between a reference z coordinate (Z) when observed by using the gel members and an observation z coordinate. The unit of the z coordinate is μm. Note that combinations of Z and P using the gel members are the combinations of Z and P where the images that are close enough to be determined as substantially the same as the images acquired with the combinations of Z and P using the oil are acquired. Furthermore, the results in FIG. 10 and FIG. 11 are the results acquired by using a microscope of FIG. 12 to be described later.

The gel members used are five kinds of gel members having penetration of 55, 62, 69, 91, and 111. Note that the penetration discussed herein means ¼ scale penetration. In Table T1, it is indicated that z-stack imaging was performed six times with the gel member (gel number 1) having the penetration of 55. Furthermore, it is indicated that z-stack imaging was performed six times, four times, and five times with the gel member (gel number 2) having the penetration of 62, with the gel member (gel number 3) having the penetration of 69, and the gel member (gel number 4) having the penetration of 91, respectively. Furthermore, in Table T2, it is indicated that four gel members (gel numbers 5 to 8) having the penetration of 111 were prepared and z-stack imaging was performed two times each.

First, the result of the gel member (gel number 1) having the penetration of 55 indicated in Table T1 will be discussed. The result of the first z-stack imaging is excluded from the discussion since the condition thereof is greatly different from those of the second z-stack imaging and thereafter in respect that the gel member is not in a crushed state yet. The results of the second imaging and thereafter will be discussed. In the first z-stack imaging, measured were the positions where same images as the images acquired at the depth of 0 μm, 50 μm, 100 μm, 150 μm, 200 μm, 250 μm, and 300 μm when using oil were acquired.

Paying attention to the results of the second imaging and thereafter of the gel member (gel number 1) having the penetration of 55, specifically at the observation z position at which the image corresponding to the depth of 200 μm in the case of using oil was acquired, the variation at the observation z position is 7 μm at the maximum. On the contrary, with the gel member (gel number 2) having the penetration of 62, the gel member (gel number 3) having the penetration of 69, the gel member (gel number 4) having the penetration of 91, and the gel members (gel numbers 5-8) having the penetration of 111, the variations at the observation z position are 5 μm, 3 μm, 2 μm, and 1 μm at the maximum, respectively.

From the results, there are more variations in the observation position when the penetration is lower, that is, when the gel member is harder. It is assumed that, the harder the gel member, the more the pressure is applied to the container and the sample when the gel member is deformed to the shape corresponding to the distance between the objective and the container, thereby shifting the positions of the container and the sample. In the meantime, supposing that the size of cells is 20 µm, if the variation of the observation position can be suppressed to 10 µm as a half thereof, it is possible to capture and observe the same cell when performing repeated observation. Therefore, from the measurement results presented in FIG. 10 and FIG. 11, it is determined to be possible to suppress the variation to 10 µm when the penetration of the gel member is equal to or more than 44 that is the lower limit value of the range of the desirable ¼ scale penetration. That is, when the gel member satisfies the desirable ¼ scale penetration range described above, reproducibility of the observation position can be secured.

Next, the results in Table T2 will be discussed. Indicated therein are the results acquired by performing Z-stack imaging twice for each of the four gel members having the same penetration of 111. Although not indicated in Table T2, the Z positions were stable, and the Z positions same as those of the second Z-stack imaging of each gel were acquired also in the third Z-stack imaging except for the gel number 7. Note, however, that the third imaging was not able to be performed in the shallow part of the sample with the gel number 7. It is because the gel was pressured and crushed at the time of the second observation of the deep area and the gel shape was not properly restored at the time of the third observation of the shallow area of the sample so that it was not possible to fill the space between the container and the objective with the gel member.

From the results described above, there is a possibility that the gel is crushed and cannot be restored so that observations in the shallow area of the sample cannot be repeated. However, since 75% thereof were able to perform observations repeatedly, it is considered that the gel member can be used repeatedly by having the penetration of 111 as the upper limit value. Thus, when the gel member satisfies the desirable ¼ scale penetration range described above, the gel member can change its shape in accordance with the distance between the container and the objective so as to fill the space between the container and the objective even when used repeatedly.

As described above, it is desirable for the gel member to have the ¼ scale penetration indicating the value of 44 to 111, both inclusive.

Figure 12:
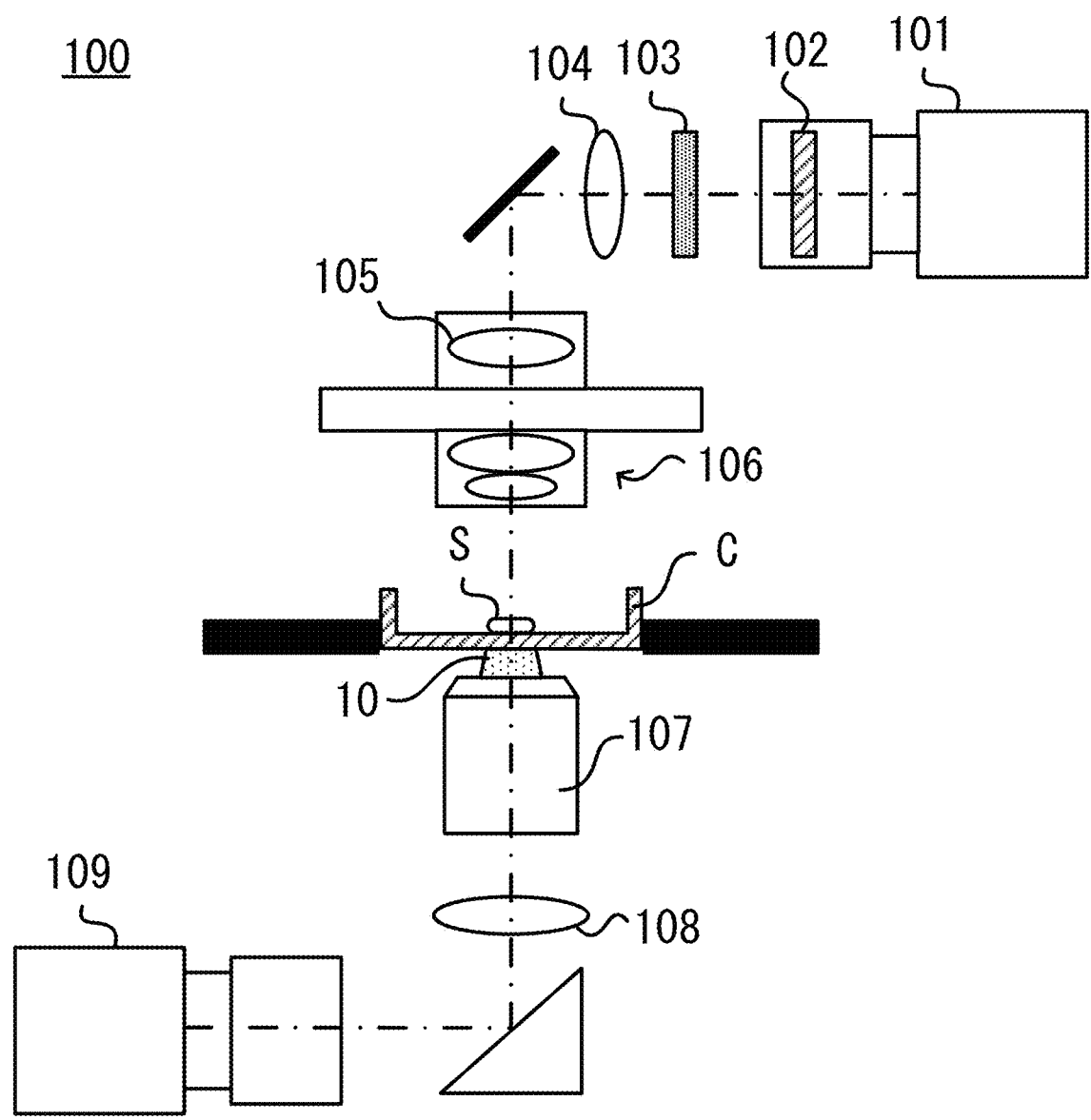
FIG. 12 is a diagram for describing the configuration of a microscope device used in experiments.
Figure 13:
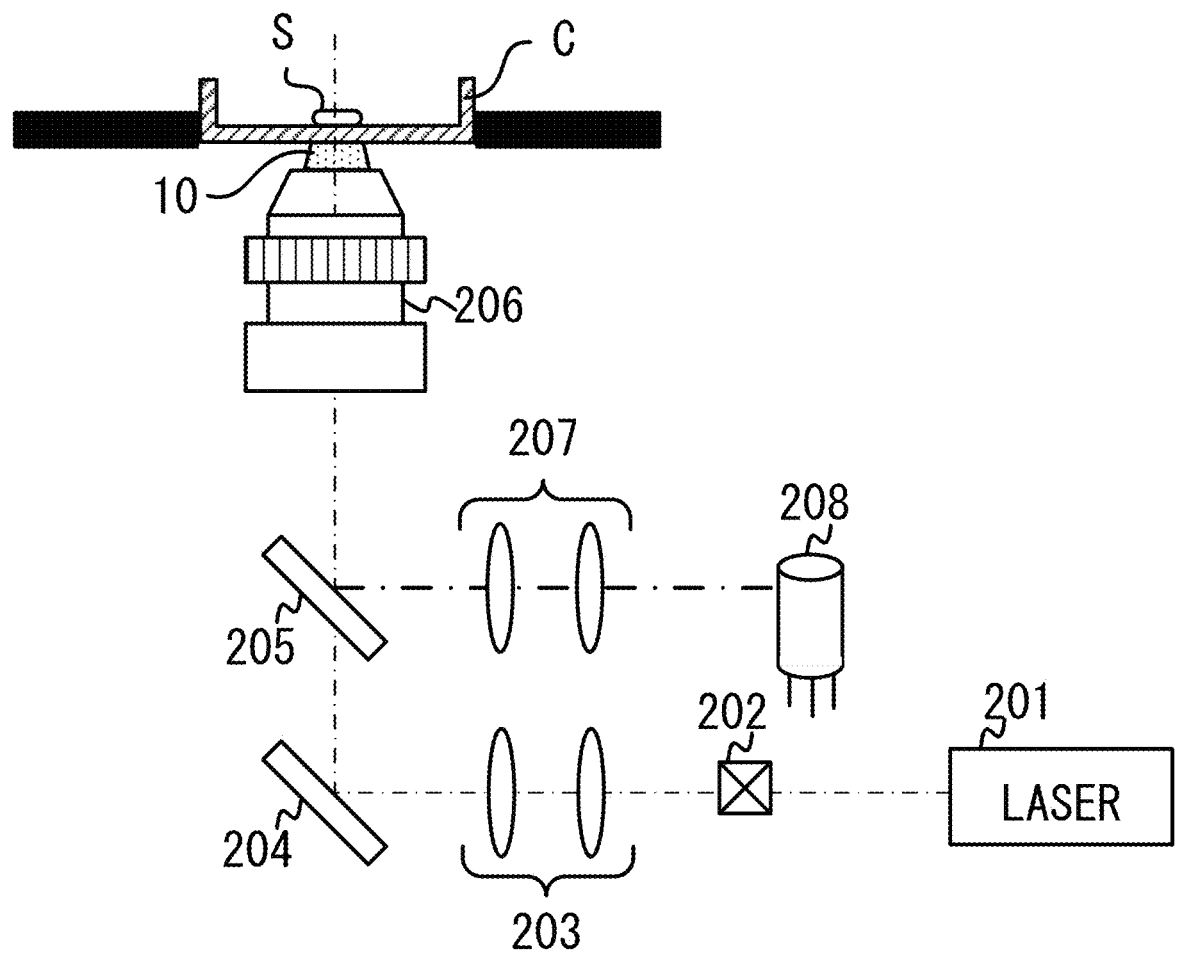
FIG. 13 is a diagram for describing a configuration of another microscope device used in experiments.
Figure 14:
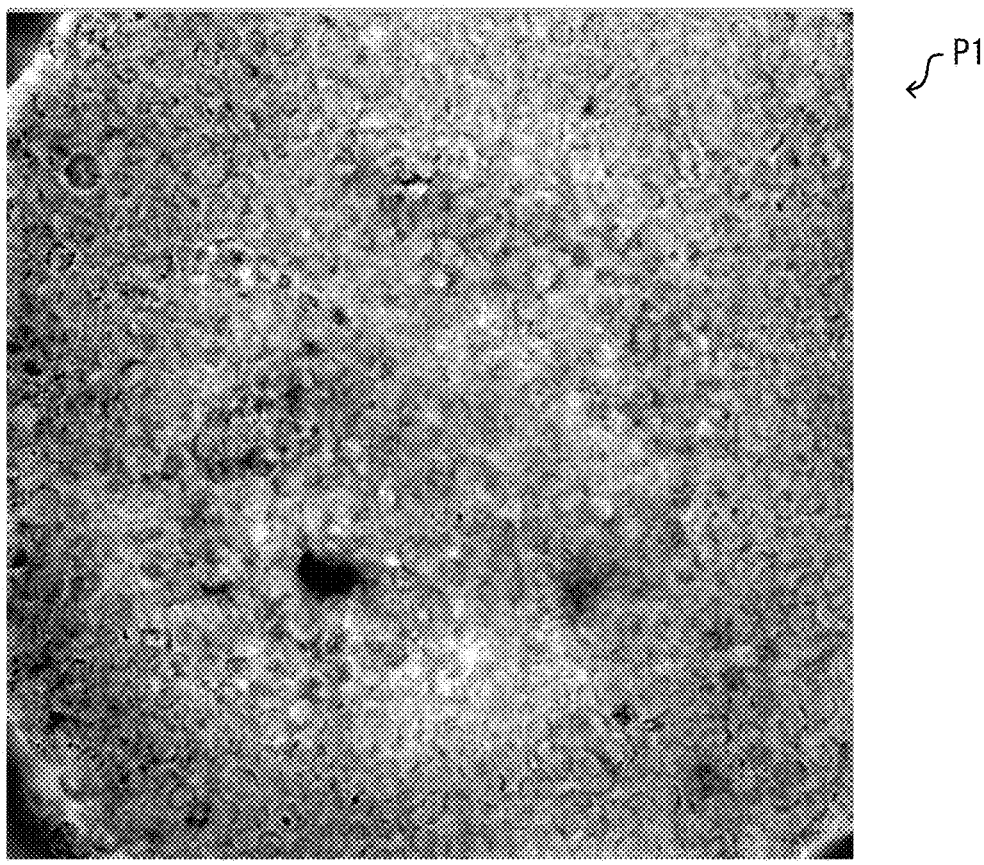
FIG. 14 is a microscopic image acquired in Experiment 1 by using oil as an immersion liquid.
Figure 15:
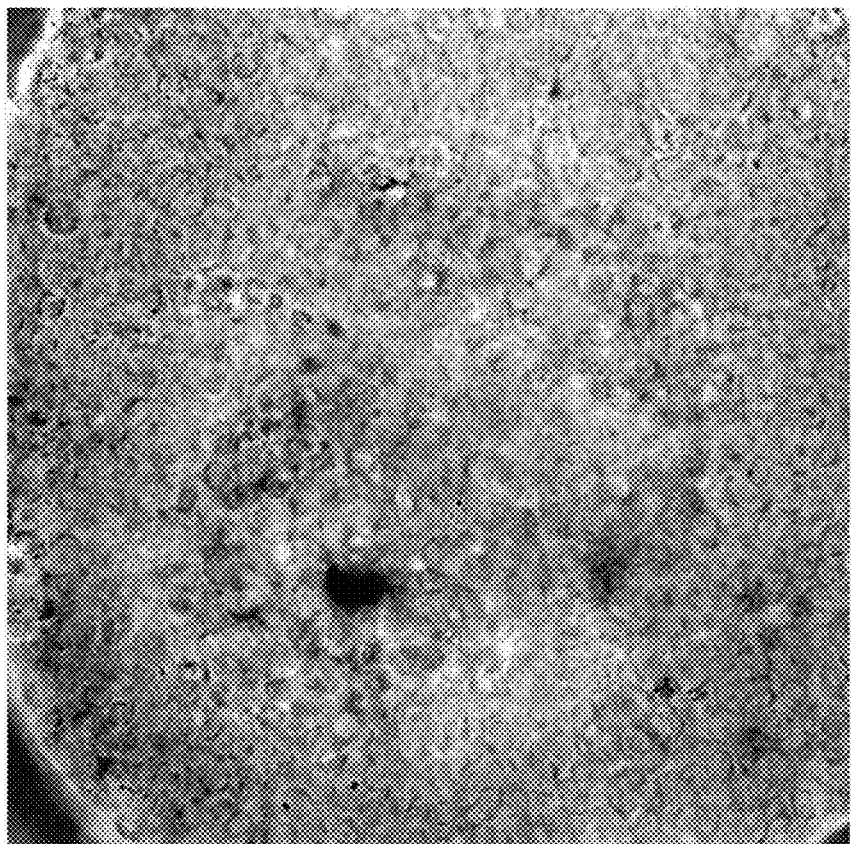
FIG. 15 is a microscopic image acquired in Experiment 1 by using a gel member as an immersion liquid.
Figure 16:
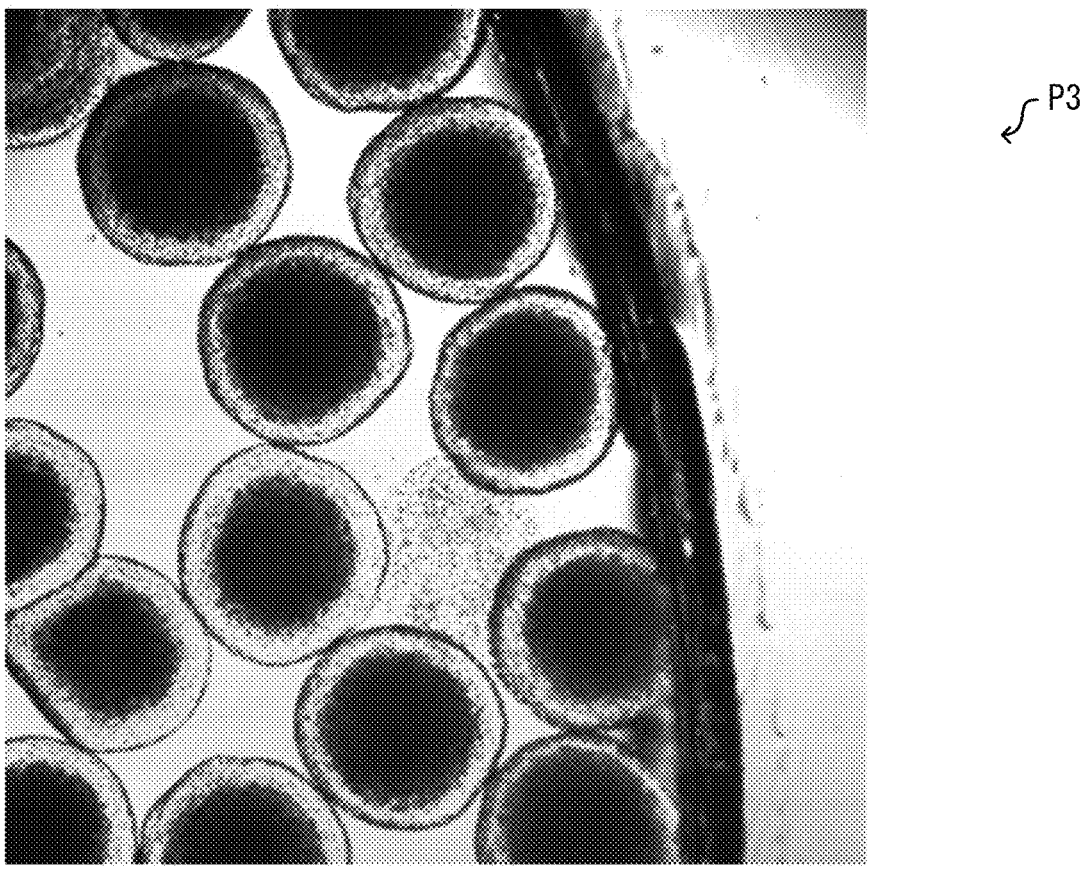
FIG. 16 is a microscopic image acquired in Experiment 10 by using a 4× dry objective.
Figure 17:
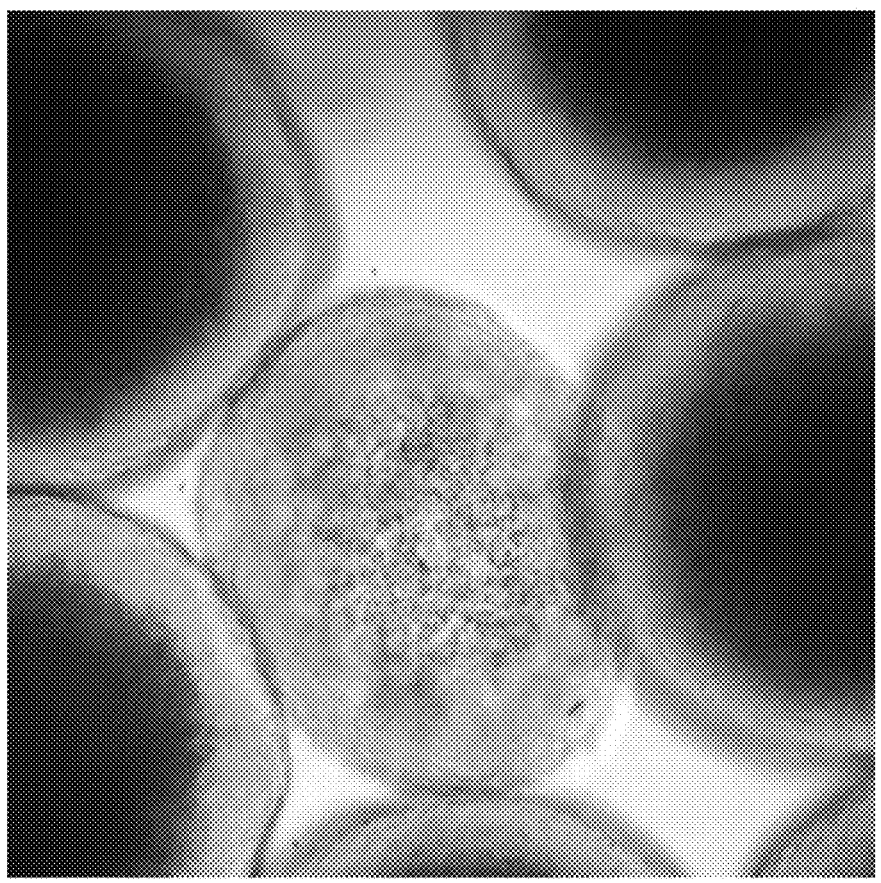
FIG. 17 is a microscopic image acquired in Experiment 10 by using a 10× dry objective.
Figure 18:
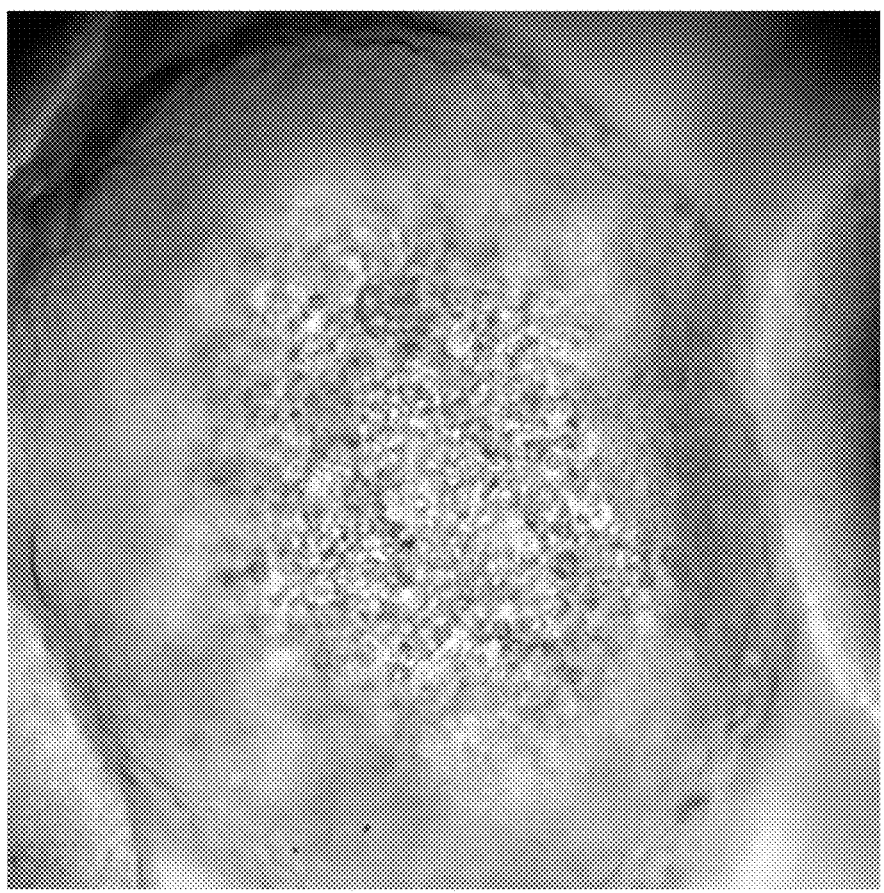
FIG. 18 is a microscopic image acquired in Experiment 10 by using a 20× dry objective.
Figure 19:
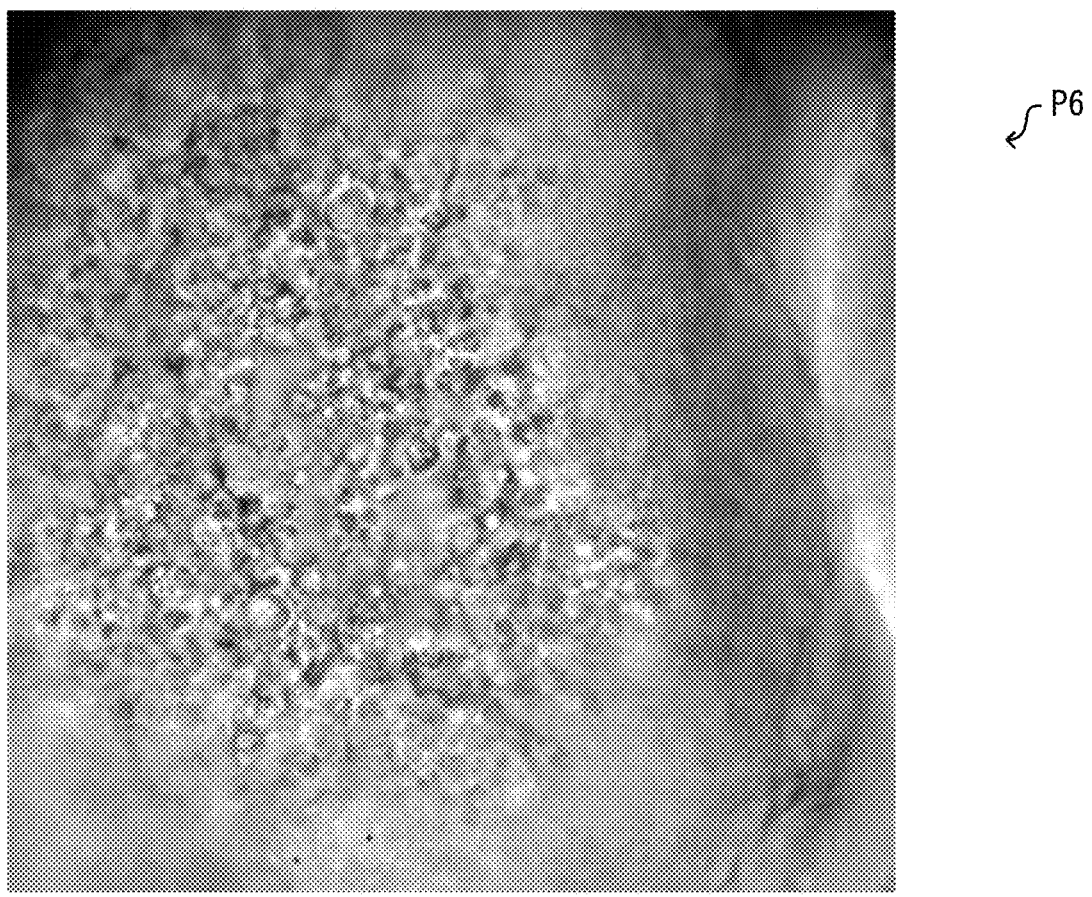
FIG. 19 is a microscopic image acquired in Experiment 10 by using a 30× immersion objective.

FIG. 12 and FIG. 13 are diagrams for describing the configuration of a microscope device used in experiments. FIG. 14 is a microscopic image acquired in Experiment 1 by using oil as the immersion liquid, and FIG. 15 is a microscopic image acquired in Experiment 1 by using a gel member as the immersion liquid. FIG. 16 to FIG. 18 are microscopic images acquired in Experiment 10 by using 4×, 10×, and 20× dry objectives, respectively. FIG. 19 is a microscopic image acquired in Experiment 10 by using a 30× immersion objective.

Hereinafter, various experiments carried out by the inventors will be described by referring to FIG. 12 to FIG. 19, and the results thereof will be discussed. First, the microscope devices used in the experiments will be described by referring to FIG. 12 and FIG. 13.

A microscope device 100 illustrated in FIG. 12 is an inverted microscope device, which is an example of an optical signal detection device that detects optical signals. The microscope device 100 includes a halogen lamp 101 as a light source, and includes, on an illumination light path from the halogen lamp 101 to the sample S, a bandpass filter 102 that allows light with a wavelength range of 1100±25 nm to pass through, a diffusion plate 103, a collimator lens 104, a window lens 105, and a collector lens 106. Furthermore, the microscope device 100 includes a camera 109 having a complementary metal oxide semiconductor (CMOS) image sensor with an increased sensitivity for a near infrared wavelength region, and includes, on an observation light path from the sample S held in the container C to the camera 109, an objective 107 and a tube lens 108.

The objective 107 is an immersion objective. The above-described gel member 10 is filled between the objective 107 and the container C.

The microscope device 100 acquires images with the brightfield microscopy. Specifically, in a state where the space between the objective 107 and the container C is filled with the gel member 10 having the ¼ scale penetration indicating the value of 44 to 111, both inclusive, the microscope device 100 irradiates the sample S with the near infrared light that has passed through the bandpass filter 102 and is hard to be scattered and detects, by the camera 109, the light from the sample S being incident via the objective 107 to acquire an image of the sample S. Furthermore, the microscope device 100 may change the distance between the objective 107 and the sample S (the container C) in the optical axis direction, and repeat irradiation of the sample S with the light and detection of the light from the sample S every time the distance is changed.

A microscope device 200 illustrated in FIG. 13 is an inverted microscope device and more specifically is a two-photon excitation laser scanning microscope device, which is an example of an optical signal detection device that detects optical signals. The microscope device 200 includes a laser 201 as a light source, and includes, on an illumination light path from the laser 201 to the sample S, a scanner 202, a relay lens 203, a mirror 204, a dichroic mirror 205, and an objective 206. The scanner 202 is a two-dimensional scanner that deflects the illumination light to the two directions orthogonal to the optical axis of the objective 206, and may include a galvanometer scanner and a resonant scanner, for example. Furthermore, the microscope device 200 includes a photodetector 208, and includes, on an observation light path from the sample S held in the container C to the photodetector 208, the objective 206, the dichroic mirror 205, and a relay lens 207 relaying the pupil of the objective 206 to the photodetector 208.

The objective 206 is an immersion objective. The above-described gel member 10 is filled between the objective 206 and the container C.

The microscope device 200 acquires images with the two-photon excitation fluorescence microscopy. Specifically, in a state where the space between the objective 206 and the container C is filled with the gel member 10 having the ¼ scale penetration indicating the value of 44 to 111, both inclusive, the microscope device 200 irradiates the sample S with the laser light having the excitation wavelength of 700 nm while two-dimensionally moving the irradiation position by the scanner 202 and detects, by the photodetector 208, the fluorescent light from the sample S being incident via the objective 206 to acquire an image of the sample S based on the signal detected by the photodetector 208 and the information of the irradiation position. Furthermore, the microscope device 200 may change the distance between the objective 206 and the sample S (the container C) in the optical axis direction, and repeat irradiation of the sample S with the light and detection of the fluorescent light from the sample S every time the distance is changed.

The experiments carried out are a total of eleven kinds from Experiment 1 to Experiment 11, and it is confirmed that good observations can be done by using the gel members in all of those experiments. Whether a good observation was performed or not was checked by comparing the images acquired by using the gel members with the images acquired by using the immersion liquid such as water or oil for Experiments 1-4 and 7-8, while it was checked based on the images alone acquired by using the gel members for Experiments 5-6 and 9-11. Details of each of the experiments are as follows.

Experiment 1
    Observation pattern: capturing images at reference z coordinate Z=52 µm, 156 µm, and 263 µm (capturing images at z coordinate positions where images similar to those captured at each reference z coordinate position by using comparison target immersion liquid are acquired)
    Comparison target immersion liquid and positions: silicone oil, reference z coordinate Z=50 µm, 150 µm, and 250 µm
    Objective: 30× oil immersion objective with NA=1.05, WD=0.8 mm
    Material of gel member: silicone gel
    Penetration of gel member (¼ scale penetration): 69
    Refractive index of gel member: 1.405
    Shape of gel member: rectangular parallelepiped shape with 4 mm in length×4 mm in width×0.9 mm in thickness
    Microscope: microscope device 100
    Observation method: transparent brightfield microscopy
    Center wavelength: 1100 nm
    Container: 35 mm glass bottom dish
    Weight: about 210 g
    Sample: spheroids of HT29 cells with about 350 µm in thickness
    Microscopic image P1 presented in FIG. 14 is a brightfield image of the sample acquired by using silicone oil at Z=150 µm. Microscopic image P2 presented in FIG. 15 is a brightfield image of the sample acquired by using a gel member at Z=156 µm. From FIG. 14 and FIG. 15, it can be confirmed that the image comparable to that of the case using silicone oil can be acquired also in the case of using the gel member.

Experiment 2
    Observation pattern: capturing images at reference z coordinate Z=51 µm, 152 µm, and 255 µm (capturing images at z coordinate positions where images similar to those captured at each reference z coordinate position by using comparison target immersion liquid are acquired)
    Comparison target immersion liquid and positions: silicone oil, reference z coordinate Z=50 µm, 150 µm, and 250 µm
    Objective: 30× oil immersion objective with NA=1.05, WD=0.8 mm
    Material of gel member: silicone gel
    Penetration of gel member (¼ scale penetration): 111
    Refractive index of gel member: 1.405
    Shape of gel member: rectangular parallelepiped shape with 4 mm in length×4 mm in width×0.9 mm in thickness
    Microscope: microscope device 100
    Observation method: transparent brightfield microscopy
    Center wavelength: 1100 nm
    Container: 35 mm glass bottom dish
    Weight: about 210 g
    Sample: spheroids of HT29 cells with about 350 µm in thickness Experiment 3
    Observation pattern: capturing images at reference z coordinate Z=52 µm, 156 µm, and 260 µm (capturing images at z coordinate positions where images similar to those captured at each reference z coordinate position by using comparison target immersion liquid are acquired)
    Comparison target immersion liquid and positions: silicone oil, reference z coordinate Z=50 µm, 150 µm, and 250 µm
    Objective: 30× oil immersion objective with NA=1.05, WD=0.8 mm
    Material of gel member: silicone gel
    Penetration of gel member (¼ scale penetration): 69
    Refractive index of gel member: 1.405
    Shape of gel member: spherical segment shape with Φ6×1.1 mm in maximum thickness (curvature radius=4.64 mm)
    Microscope: microscope device 100
    Observation method: transparent brightfield microscopy
    Center wavelength: 1100 nm
    Container: 35 mm glass bottom dish
    Weight: about 210 g
    Sample: spheroids of HT29 cells with about 350 µm in thickness Experiment 4
    Observation pattern: capturing images at reference z coordinate Z=49 µm, 148 µm, and 246 µm (capturing images at z coordinate positions where images similar to those captured at each reference z coordinate position by using comparison target immersion liquid are acquired)
    Comparison target immersion liquid and positions: water, reference z coordinate Z=49 µm, 149 µm, and 245 µm
    Objective: 25× water immersion objective with NA=1.05, WD=2 mm
    Material of gel member: AQUAJOINT
    Penetration of gel member (¼ scale penetration): 96
    Refractive index of gel member: 1.356
    Shape of gel member: truncated cone shape with Φ3 top face×Φ7 bottom face×2.5 mm in thickness
    Microscope: microscope device 100
    Observation method: transparent brightfield microscopy
    Center wavelength: 1100 nm
    Container: 35 mm glass bottom dish
    Weight: about 130 g
    Sample: spheroids of HT29 cells with about 350 µm in thickness Experiment 5
    Observation pattern: capturing images at reference z coordinate Z=50 µm, 100 µm, 150 µm, 200 µm, 250 µm, and 300 µm
    Comparison target immersion liquid: None
    Objective: 25× two-photon excitation immersion objective with NA=1, WD=8 mm
    Material of gel member: urethane gel
    Penetration of gel member (¼ scale penetration): 44
    Refractive index of gel member: 1.458
    Shape of gel member: truncated cone shape with Φ4 top face×Φ18 bottom face×8 mm in thickness
    Microscope: microscope device 100
    Observation method: transparent brightfield microscopy
    Center wavelength: 1100 nm Container: 35 mm glass bottom dish
Weight: about 210 g
Sample: spheroids of HT29 cells with about 350 μm in thickness cleared by using SCALEVIEW-S4

Experiment 6
Observation pattern: capturing images at reference z coordinate Z=50 μm, 100 μm, 150 μm, 200 μm, 250 μm, and 300 μm
Comparison target immersion liquid: None
Objective: 25× two-photon excitation immersion objective with NA=1, WD=8 mm
Material of gel member: urethane gel
Penetration of gel member (¼ scale penetration): 44
Refractive index of gel member: 1.458
Shape of gel member: truncated cone shape with Φ4 top face×Φ18 bottom face×8 mm in thickness
Microscope: microscope device 200
Observation method: two-photon excitation fluorescence microscopy (DAPI stain)
Excitation center wavelength: 700 nm (fluorescence wavelength of 460 to 500 nm)
Container: 35 mm glass bottom dish
Weight: about 200 g
Sample: spheroids of HT29 cells with about 350 μm in thickness cleared by using SCALEVIEW-S4

Experiment 7
Observation pattern: capturing images at reference z coordinate Z=0 μm, 100 μm, and 200 μm
Comparison target immersion liquid and positions: silicone oil, reference z coordinate=same with those of gel
Objective: 30× oil immersion objective with NA=1.05, WD=0.8 mm
Material of gel member: silicone gel
Penetration of gel member (¼ scale penetration): 111
Refractive index of gel member: 1.405
Shape of gel member: rectangular parallelepiped shape with 4 mm in length×4 mm in width×0.9 mm in thickness
Microscope: microscope device 100
Observation method: transparent brightfield microscopy
Center wavelength: 1100 nm Container: 384-well U-bottom microplate
Weight: None
Sample: spheroids of HT29 cells with about 350 μm in thickness Experiment 8
Observation pattern: capturing images at reference z coordinate Z=135 μm, 230 μm, and 300 μm
Comparison target immersion liquid: silicone oil
Objective: 30× oil immersion objective with NA=1.05, WD=0.8 mm
Material of gel member and positions: silicone gel, reference z coordinate=same with those of gel
Penetration of gel member (¼ scale penetration): 111
Refractive index of gel member: 1.405
Shape of gel member: rectangular parallelepiped shape with 4 mm in length×4 mm in width×0.9 mm in thickness
Microscope: microscope device 200
Observation method: two-photon excitation fluorescence microscopy (DAPI stain)
Excitation center wavelength: 700 nm
Container: 384-well U-bottom microplate
Weight: about 240 g
Sample: spheroids of HT29 cells with about 350 μm in thickness Experiment 9
Observation pattern: searching target area with 4× dry objective, and capturing images by changing the lens with 30× immersion objective while adjusting XYZ positions
Comparison target immersion liquid: None
Objective: 4× dry objective with NA=0.16, WD=13 mm
30× oil immersion objective with NA=1.05, WD=0.8 mm
Material of gel member: silicone gel
Penetration of gel member (¼ scale penetration): 69
Refractive index of gel member: 1.405
Shape of gel member: spherical segment shape with Φ6×1.1 mm in maximum thickness (curvature radius=4.64 mm)
Microscope: microscope device 100
Observation method: transparent brightfield microscopy
Center wavelength: 1100 nm
Container: 35 mm glass bottom dish
Weight: about 130 g
Sample: spheroids of HT29 cells with about 350 μm in thickness Experiment 10
Observation pattern: searching target areas by switching lenses in order of 4× dry objective, 10× dry objective, and 20× dry objective, and then capturing images by changing the lens with 30× immersion objective
Comparison target immersion liquid: None
Objective: 4× dry objective with NA=0.16, WD=13 mm
10× dry objective with NA=0.3, WD=10 mm
20× dry objective with NA=0.7, WD=1.7 mm
30× oil immersion objective with NA=1.05, WD=0.8 mm
Material of gel member: silicone gel
Penetration of gel member (¼ scale penetration): 69
Refractive index of gel member: 1.405
Shape of gel member: rectangular parallelepiped shape with 4 mm in length×4 mm in width×0.9 mm in thickness
Microscope: microscope device 100
Observation method: transparent brightfield microscopy
Center wavelength: 975 nm
Container: 35 mm glass bottom dish
Weight: about 50 g
Sample: spheroids of HT29 cells with about 150 μm in thickness Microscopic image P3 presented in FIG. 16 is a brightfield image of the sample acquired by using the 4× dry objective. Microscopic image P4 presented in FIG. 17 is a brightfield image of the sample acquired by using the 10× dry objective. Microscopic image P5 presented in FIG. 18 is a brightfield image of the sample acquired by using the 20× dry objective. Microscopic image P6 presented in FIG. 19 is a brightfield image of the sample acquired by using the 30× immersion objective. As in FIG. 16 to FIG. 19, even in a case where the dry objective is switched to the immersion objective during observations, the use of the immersion objective along with the gel member makes it possible to observe the sample in detail by gradually increasing the magnification of the observations without losing the sight of the target area.

Experiment 11
Observation pattern: moving to XY direction to switch imaging-target well, and then capturing image
Comparison target immersion liquid: None
Objective: 25× immersion objective with NA=1, WD=4 mm
Material of gel member: silicone gel
Penetration of gel member (¼ scale penetration): 62

Refractive index of gel member: 1.405

Shape of gel member: truncated cone shape with Φ3 top face×Φ14 bottom face×4 mm in thickness Microscope: microscope device 200

Observation method: two-photon excitation fluorescence microscopy (DAPI stain)

Excitation center wavelength: 700 nm

Container: 96-well U-bottom microplate

Weight: about 240 g

Sample: spheroids of HT29 cells with about 350 μm in thickness

The embodiments described above are specific examples provided for facilitating easy understanding of the present invention, and the present invention is not limited only to the embodiments but may include modified forms of the embodiments and alternative forms that are substitutes of the embodiments. That is, structural elements in each of the embodiments can be modified without departing from the gist and scope thereof. Furthermore, a plurality of structural elements disclosed in one or more of the embodiments may be combined as appropriate to have a new embodiment. Furthermore, some of the structural elements may be omitted from the structural elements disclosed in each of the embodiments or some structural elements may be added thereto. Moreover, the order of the processing performed in each of the embodiments may be changed as long as there is no inconsistency. That is, various modifications and changes are possible in the optical signal detection device, the gel member, and the optical signal detection method of the present invention without departing from the scope of the appended claims.

Figure 20:
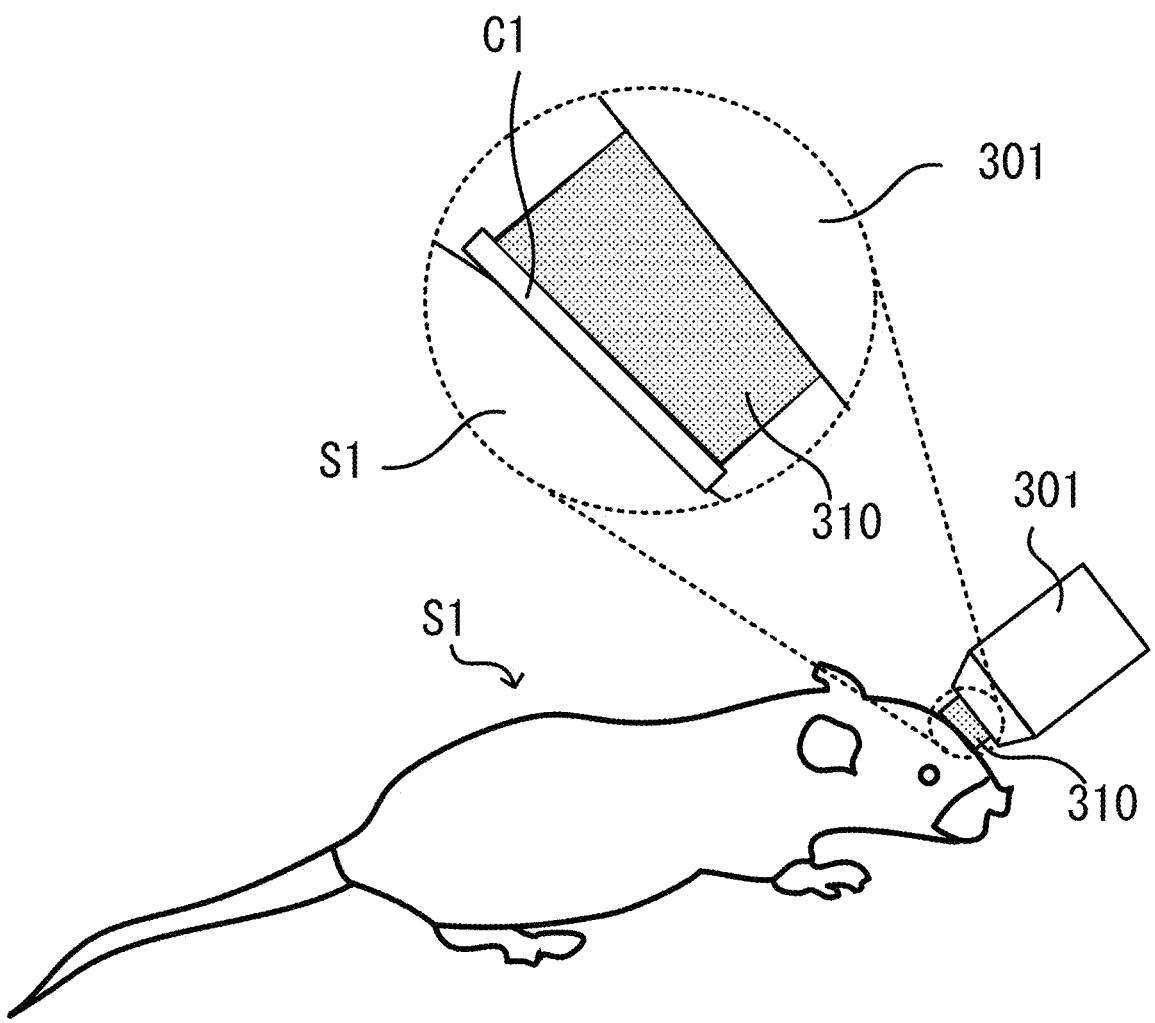
FIG. 20 is a diagram illustrating an example observed from an oblique direction.

While the example where the optical signal detection device is an inverted microscope is described in the embodiments, the optical signal detection device is not limited to the inverted microscope. The gel member has no liquidity, so that it is applicable also for observations from oblique and lateral directions. Therefore, as illustrated in FIG. 20, in a case of observing a temporal region of a relatively large animal S1 such as a live mouse or marmoset, for example, the optical signal detection device may capture images while sandwiching a gel member 310 between an objective 301 tilted toward the temporal region of the animal S1 and the temporal region of the animal S1. In that case, a cover glass C1 may be embedded in advance in the temporal region of the animal S1 by a surgical operation, and the space between the cover glass C1 and the objective 301 may be filled with the gel member 310.

Figure 21:
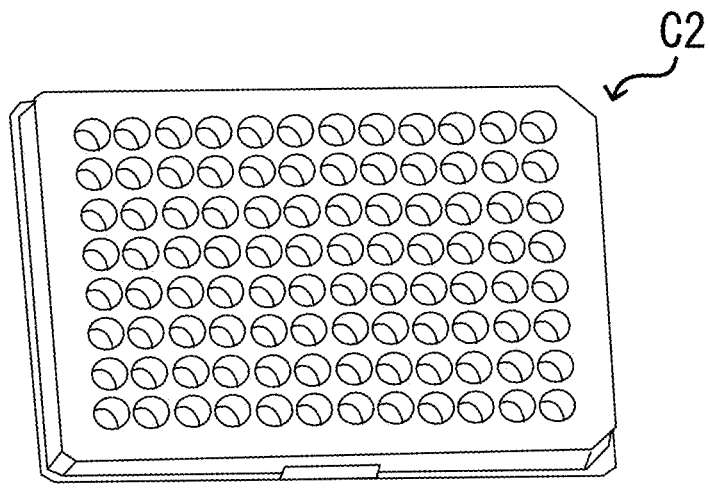
FIG. 21 is a perspective view of a microplate.
Figure 22:
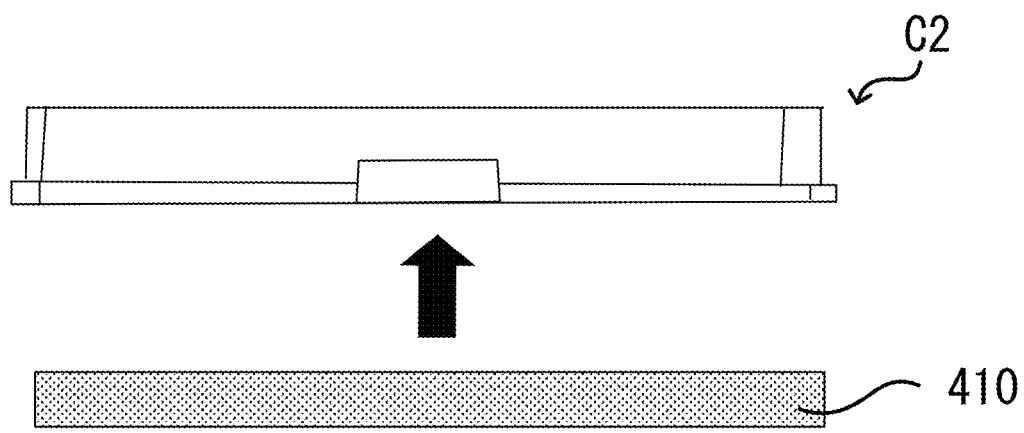
FIG. 22 is a diagram for describing the structure of the microplate.

While described in the embodiments above is the example where the gel member is stuck to the objective first and then the objective is brought closer to the container to fill the space between the container and the objective with the gel member, the attaching order of the gel member is not specifically limited as long as the space between the container and the objective is filled with the gel member. For example, as illustrated in FIG. 21 and FIG. 22, observations may be performed by using a microplate C2 with a great number of wells having a gel member 410 stuck to the back face thereof. It is desirable for the gel member 410 to have the ¼ scale penetration of 44 to 111, both inclusive, and to be closely fitted to the back face of the microplate C2 without a gap by being deformed to fit the shape of the back face of the microplate C2. In that case, the space between the objective and the microplate C2 can be filled with the gel member 410 by pressing the objective against the gel member 410 on the back face of the microplate C2, so that it is possible to easily observe the samples with a high numerical aperture.

While it is described in the embodiments above to use an existing immersion objective designed for immersion media such as silicone oil and water and to use the gel member instead of the immersion media, it is also possible to use an objective designed anew specifically for the gel member to be used. This makes it possible to increase flexibility in selecting gel members since the objective can be designed anew in accordance with the refractive index of the assumed gel member.

What is claimed is:

1. An optical signal detection device comprising:
   an objective;
   a holding member provided between the objective and a sample and configured to hold the sample; and
   a gel member that fills a space between the objective and the holding member,
   wherein the gel member has ¼ scale penetration indicating a value of 44 to 111, both inclusive, as measured based on a penetration test using a ¼ scale cone of JIS K 2220.

2. The optical signal detection device according to claim 1, wherein a contact area between the gel member and the objective is larger than a contact area between the gel member and the holding member.

3. The optical signal detection device according to claim 1, further comprising a revolving nosepiece on which the objective is mounted,
   wherein when the revolving nosepiece rotates while the gel member is stuck to the objective, the gel member stuck to the objective is moved out of a light path of the objective along with the objective.

4. The optical signal detection device according to claim 1, wherein the gel member sticks to the objective in a freely detachable manner.

5. The optical signal detection device according to claim 1, wherein the gel member has a tapered shape in which a cross-sectional area is reduced from the objective toward the holding member.

6. The optical signal detection device according to claim 5, wherein the gel member has a truncated cone shape.

7. The optical signal detection device according to claim 1, wherein the gel member has a convex face formed by a curvature on a holding member side.

8. The optical signal detection device according to claim 1, wherein a thickness of the gel member is 1.1 times to 1.5 times, both inclusive, of a working distance of the objective.

9. The optical signal detection device according to claim 1, wherein a refractive index difference between the gel member and the holding member is within +0.1.

10. The optical signal detection device according to claim 1, wherein a refractive index difference between the gel member and the sample or a medium that covers the sample is within +0.1.

11. A gel member attached to a front end of an objective, the gel member having ¼ scale penetration indicating a value of 44 to 111, both inclusive, as measured based on a penetration test using a ¼ scale cone of JIS K 2220.

12. The gel member according to claim 11, wherein the gel member sticks to the objective in a freely detachable manner.

13. The gel member according to claim 11, wherein the gel member has a tapered shape in which a cross-sectional area is reduced toward one direction.

14. The gel member according to claim 13, wherein the gel member has a truncated cone shape.

15. The gel member according to claim 11, wherein the gel member has a convex face formed by a curvature.

16. The gel member according to claim 12, wherein:
a refractive index difference between the gel member and a holding member is within +0.1,
the holding member holds a sample to be observed using the objective between the objective and the sample, and
a space between the objective and the holding member is filled with the gel member.

17. The gel member according to claim 12, wherein a refractive index difference between the gel member and the sample or a medium that covers a sample to be observed using the objective is within +0.1.

18. The gel member according to claim 12, wherein a thickness of the gel member is 1.1 times to 1.5 times, both inclusive, of a working distance of the objective.

19. The gel member according to claim 12, wherein a contact area between the gel member and the objective is larger than a contact area between the gel member and a holding member that holds a sample.

20. An optical signal detection method comprising:
illuminating a sample with light in a state where a space between an objective and a holding member that holds a sample is filled with a gel member having ¼ scale penetration indicating a value of 44 to 111, both inclusive, as measured based on a penetration test using a ¼ scale cone of JIS K 2220; and
detecting, by a photodetector, light from the sample that is incident via the objective.

21. The optical signal detection method according to claim 20, further comprising:
changing a distance between the objective and the sample in an optical axis direction of the objective; and
every time the distance is changed, repeating illuminating the sample with the light and detecting, by the photodetector, the light from the sample.

22. The optical signal detection device according to claim 1, wherein the objective is an immersion objective.

23. The gel member according to claim 11, wherein the objective is an immersion objective.

24. The optical signal detection method according to claim 20, wherein the objective is an immersion objective.

* * * * *